US012520078B2

(12) United States Patent
Liu et al.

(10) Patent No.: US 12,520,078 B2
(45) Date of Patent: Jan. 6, 2026

(54) WEARABLE AUDIO DEVICES WITH ENHANCED VOICE PICKUP

(71) Applicant: Bose Corporation, Framingham, MA (US)

(72) Inventors: Yang Liu, Boston, MA (US); Douglas George Morton, Southborough, MA (US)

(73) Assignee: Bose Corporation, Framingham, MA (US)

( * ) Notice: Subject to any disclaimer, the term of this patent is extended or adjusted under 35 U.S.C. 154(b) by 189 days.

(21) Appl. No.: 18/243,762

(22) Filed: Sep. 8, 2023

(65) Prior Publication Data

US 2025/0088794 A1 Mar. 13, 2025

(51) Int. Cl.
*H04R 3/00* (2006.01)
*G10L 21/0216* (2013.01)
(Continued)

(52) U.S. Cl.
CPC .......... *H04R 3/005* (2013.01); *G10L 21/0232* (2013.01); *G10L 25/21* (2013.01);
(Continued)

(58) Field of Classification Search
CPC ...... H04R 3/005; H04R 1/1083; H04R 1/406; H04R 2460/13; H04R 1/1016; H04R 2420/07; H04R 2201/403; H04R 1/1041; H04R 2201/107; H04R 5/033; H04R 2410/01; H04R 2430/20; H04R 2410/05; H04R 2410/07; H04R 2460/01; H04R 1/1033; H04R 1/46; H04R 2205/022; H04R 2430/03; H04R 2430/23; H04R 2430/25; H04R 2499/13; H04R 3/00; H04R 3/04; H04R 5/04; G10L 25/78; G10L 25/33; G10L 2021/02166; G10L 21/0232; G10L 21/034; G10L 21/0388; G10L 25/18; G10L 15/05; G10L 15/20; G10L 15/30; G10L 2015/088; G10L 2015/223; G10L 2025/786; H04W 4/02; H03G 3/3005; H03G 5/165; G10K 11/178; G06F 3/0488;
(Continued)

(56) References Cited

U.S. PATENT DOCUMENTS 9,432,769 B1 * 8/2016 Sundaram ............... G10L 25/72
10,424,315 B1 9/2019 Ganeshkumar
(Continued)

*Primary Examiner* — Lun-See Lao

(57) ABSTRACT

A wearable two-way communication audio device includes a first microphone that provides a first microphone signal, a second microphone that provides a second microphone signal, and a third microphone that provides a third microphone signal. The device also includes one or more processors that are configured to process the first microphone signal and the second microphone signal to form a first beamformed signal. The one or more processors compare energy in the first beamformed signal to energy in the first microphone signal, and, if energy in the first beamformed signal exceeds energy in the first microphone signal, then the one or more processors mix the first microphone signal and the third microphone signal to provide a mixed signal. The one or more processors may also generate a voice output signal for transmission to a far end recipient using the mixed signal.

9 Claims, 5 Drawing Sheets

(51) Int. Cl.

| | |
|---|---|
| ***G10L 21/0232*** | (2013.01) |
| ***G10L 25/21*** | (2013.01) |
| ***H04R 1/10*** | (2006.01) |
| ***H04R 1/40*** | (2006.01) |
| ***H04R 3/04*** | (2006.01) |

(52) U.S. Cl.
CPC ......... *H04R 1/1041* (2013.01); *H04R 1/1075* (2013.01); *H04R 1/406* (2013.01); *H04R 3/04* (2013.01); *G10L 2021/02166* (2013.01); *H04R 2201/401* (2013.01); *H04R 2410/01* (2013.01); *H04R 2410/07* (2013.01)

(58) Field of Classification Search
CPC .... G06F 3/04883; G06F 3/04886; G06F 3/16; G06F 3/165; G06Q 10/107; H04L 51/04; H04L 51/046; H04L 51/08; H04L 51/10; H04L 51/222; H04L 51/234; H04L 51/42; H04M 1/72433; H04M 1/72439; H04M 1/72454; H04M 2250/22; H04M 2250/52; H04M 9/08; H04N 23/62; H04N 23/631; H04N 23/06
USPC .................................... 381/71.4, 312, 74, 92
See application file for complete search history.

(56) References Cited

U.S. PATENT DOCUMENTS

| | | | | |
|---|---|---|---|---|
| 10,499,139 | B2 | 12/2019 | Ganeshkumar | |
| 11,330,358 | B2 * | 5/2022 | Ganeshkumar .. | G10K 11/17873 |
| 11,533,555 | B1 | 12/2022 | Ganeshkumar | |
| 11,683,643 | B2 * | 6/2023 | Goldstein .............. | H04R 25/02<br>381/66 |
| 2014/0270231 | A1 * | 9/2014 | Dusan .................... | H04R 3/005<br>381/74 |
| 2015/0245129 | A1 * | 8/2015 | Dusan ................. | G10L 21/0208<br>381/71.6 |
| 2020/0286500 | A1 * | 9/2020 | Mukund ............. | G10L 21/0232 |
| 2021/0241782 | A1 * | 8/2021 | Ganeshkumar ...... | H04R 1/1075 |

* cited by examiner

WEARABLE AUDIO DEVICES WITH ENHANCED VOICE PICKUP

BACKGROUND

This disclosure relates to wearable audio devices. More particularly, this disclosure relates to wearable audio devices that enhance the user's speech signal.

SUMMARY

All examples and features mentioned below can be combined in any technically possible way.

In one aspect, a wearable two-way communication audio device includes a first microphone that provides a first microphone signal, a second microphone that provides a second microphone signal, and a third microphone that provides a third microphone signal. The device also includes one or more processors that are configured to process the first microphone signal and the second microphone signal to form a first beamformed signal. The one or more processors compare energy in the first beamformed signal to energy in the first microphone signal, and, if energy in the first beamformed signal exceeds energy in the first microphone signal, then the one or more processors mix the first microphone signal and the third microphone signal to provide a mixed signal. The one or more processors may also generate a voice output signal for transmission to a far end recipient using the mixed signal.

Implementations may include one of the following features, or any combination thereof.

In some implementations, mixing the first microphone signal and the third microphone signal includes calculating an energy ratio between the first microphone signal and the third microphone signal, and selecting mixing coefficients for the first microphone signal and the third microphone signal based on the calculated energy ratio.

In certain implementations, generating the voice output signal using the mixed signal includes using the mixed signal to generate a first signal component in a first frequency range for the voice output signal and using the beamformed signal to generate second signal component in a second frequency range for the voice output signal, and combining the first signal component and the second signal component to provide the voice output signal.

In some cases, the one or more processors are configured to mix the first microphone signal and the third microphone signal to provide the mixed signal only if the energy in the first beamformed signal exceeds energy in the first microphone signal by a predetermined threshold.

In certain cases, the one or more processors are configured such that, if the energy in the first beamformed signal does not exceed the energy in the first microphone signal by the pre-determined threshold, then the first beamformed signal is used to generate the voice output signal.

In some examples, the one or more processors are configured such that, if the energy in the first beamformed signal does not exceed the energy in the first microphone signal by the pre-determined threshold, then the first microphone signal and the third microphone signal are not mixed.

In certain examples, the one or more processors are configured such that, if the energy in the beamformed signal does not exceed the energy in the first microphone signal, then the first beamformed signal is used to generate the voice output signal and the mixed signal is not used to generate the voice output signal.

In some implementations, the one or more processors are configured such that, if the energy in the first beamformed signal exceeds the energy in the first microphone signal, then the first microphone signal and the third microphone signal are mixed to provide the mixed signal, and the voice output signal is generated using a combination of the mixed signal and the first beamformed signal.

In certain implementations, the one or more processors are configured such that the first beamformed signal is used to provide a first signal component that includes frequency content above a predetermined frequency, and the mixed signal is used to provide a second signal component that includes frequency content below the predetermined frequency. The first signal component and the second signal component are combined to provide the voice output signal.

Another aspect features a wearable two-way communication audio device. The device includes a plurality of microphones and one or more processors. The one or more processors are configured to process signals from the plurality of microphones to form a first beamformed signal and estimate wind energy based on the first beamformed signal. The one or more processors are further configured to adjust a high-pass filter based on the estimated wind energy and filter an other signal with the high pass filter to provide a voice output signal.

Implementations may include one of the above and/or below features, or any combination thereof.

In some cases, the one or more processors are configured to use a band-pass filter to filter the first beamformed signal to provide a band-pass filtered signal and estimate the wind energy using the band-pass filtered signal.

In certain cases, the one or more processors are configured to adjust the high-pass filter by mapping the estimated wind energy to one of a plurality of high-pass filters each having a different corner frequency.

In some examples, the one or more processors are configured to select a first high-pass filter with a higher corner frequency when the estimated wind energy is higher, and a second high-pass filter with a lower corner frequency when the estimated wind energy is lower.

In certain examples, the plurality of high-pass filters includes at least 5 high-pass filters.

In some implementations, the plurality of high-pass filters includes at least 10 high-pass filters.

In certain implementations, the one or more processors are configured to adjust the high pass filter by adjusting a corner frequency of the high-pass filter.

In some cases, the one or more processors are configured to process signals from the plurality of microphones to form a second beamformed signal and use the second beamformed signal to generate the other signal.

According to another aspect, a wearable two-way communication audio device includes a first earpiece that includes a first plurality of microphones, and a second earpiece that includes a second plurality of microphones. The device also includes one or more processors that are configured to process signals from the first plurality of microphones to form a first beamformed signal, and process signals from the first plurality of microphones to form a second beamformed signal. The one or more processors are also configured to process signals from the second plurality of microphones to form a third beamformed signal, and process signals from the second plurality of microphones to form a fourth beamformed signal. The one or more processors compare a first wind signal derived from the second beamformed signal to a second wind signal derived from the fourth beamformed signal and select one of the first earpiece or the second earpiece to provide a voice output signal for transmission to a far end recipient based on the comparison of the first wind signal and the second wind signal.

Implementations may include one of the above and/or below features, or any combination thereof.

In certain cases, the one or more processors are further configured to compare a third wind signal derived from the first beamformed signal to a fourth wind signal derived from the third beamformed signal and select one of the first earpiece or the second earpiece to provide the voice output signal based at least in part on the comparison of the third and fourth wind signals.

In some examples, the one or more processors are further configured to calculate a first wind energy estimate based on the first beamformed signal and set a first wind flag based on the first wind energy estimate and calculate a second wind energy estimate based on the third beamformed signal and set a second wind flag based on the second wind energy estimate. The third wind signal may correspond to the first wind flag and the fourth wind signal may correspond the second wind flag.

In certain examples, if the first wind flag indicates a no wind condition on the first earpiece and the second wind flag indicates a wind condition on the second earpiece, then the first earpiece is selected provide the voice output signal.

In some implementations, the one or more processors are further configured to calculate a third wind energy estimate based on the second beamformed signal, calculate a fourth wind energy estimate based on the fourth beamformed signal, and select one of the first earpiece or the second earpiece to provide the voice output signal based on a comparison of the third and fourth wind energy estimates.

In certain implementations, the first wind signal corresponds to the third wind energy estimate, and the second wind signal corresponds to the fourth wind energy estimate.

In some cases, the one or more processors are configured such that, if both the first wind flag and the second flag indicate a wind condition, then, the one or more processors compare the third and fourth wind energy estimates, and, if the third wind energy estimate is lower than the fourth wind energy estimate, then the first earpiece is selected to provide the voice output signal.

In certain cases, in the absence of wind, the second earpiece is selected to provide the voice output signal by default.

Implementations may provide or more of the following benefits.

The systems and methods described herein may reduce wind noise, especially clustering wind noise.

Some implementations may help to reduce low frequency wind noise below 1 kHz without compromising speech intelligibility much.

Certain implementations may provide improved noise reduction. In that regard, the systems and methods described herein may use a spectral noise subtraction and/or steady state noise reduction algorithm to reduce the harsh high frequency noise leakage.

Some embodiments may provide reduced ambient noise like HVAC or fan noise in fairly quiet environment.

Certain embodiments may provide smoother noise level transitions in between when the user is talking and when the user stops talking.

Some configurations may provide more natural voice with fuller bandwidth in quiet conditions than conventional headphones.

Certain configurations may provide noticeably reduced popping/crackling sounds that appear as distortions in conventional headphones.

Some implementations may reduce the effect of a user's voice getting very quiet or spectrally unbalanced when the earpieces are rotated away from a nominal orientation or/and when the user's talks next to a hard surface such as a wall or put their hands behind their head.

Figure 1:
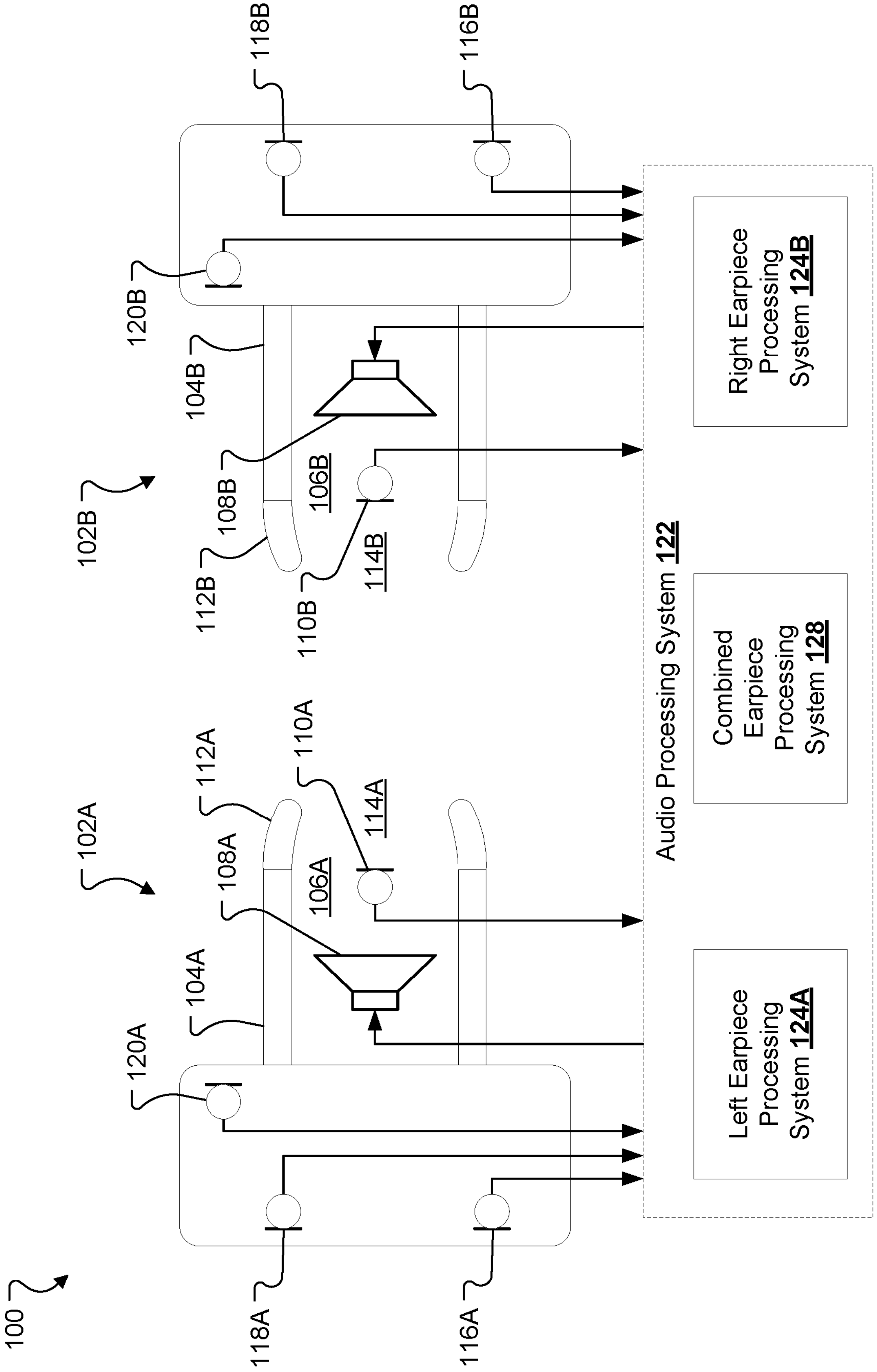
FIG. 1 is a block diagram depicting an example wearable audio device according to various disclosed implementations.

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

Aspects and implementations disclosed herein may be applicable to a wide variety of wearable audio devices in various form factors, but are generally directed to devices having at least one inner microphone that is substantially shielded from environmental noise (i.e., acoustically coupled to an environment inside the ear canal of the user) and at least one external microphone substantially exposed to environmental noise (i.e., acoustically coupled to an environment outside the ear canal of the user). Further, various implementations are directed to wearable audio devices that support two-way communications, and may for example include in-ear devices, over-ear devices, and near-ear devices. Form factors may include, e.g., earbuds, headphones, hearing assist devices, and other wearables. Further configurations may include headphones with either one or two earpieces, over-the-head headphones, behind-the neck headphones, in-the-ear or behind-the-ear hearing aids, wireless headsets, audio eyeglasses, single earphones or pairs of earphones, as well as hats, helmets, clothing or any other physical configuration incorporating one or two earpieces to enable audio communications and/or ear protection. Further, what is disclosed herein is applicable to wearable audio devices that are wirelessly connected to other devices, that are connected to other devices through electrically and/or optically conductive cabling, or that are not connected to any other device, at all.

It should be noted that although specific implementations of wearable audio devices are presented with some degree of detail, such presentations of specific implementations are intended to facilitate understanding through provision of examples and should not be taken as limiting either the scope of disclosure or the scope of claim coverage.

FIG. 1 is a block diagram of an example of an in-ear wearable audio device 100 having two earpieces 102A and 102B, each configured to direct sound towards an ear of a user. (Reference numbers appended with an "A" or a "B" indicate a correspondence of the identified feature with a particular one of the two earpieces. The letter indicators are however omitted from the following discussion for simplicity, e.g., earpiece 102 refers to either or both earpiece 102A and earpiece 102B.) Each earpiece 102 includes a casing 104 that defines a cavity 106 that contains an electroacoustic transducer 108 for outputting audio signals to the user. In addition, at least one inner microphone 110 (aka "feedback microphone" or "FB mic") is also disposed within cavity 106. In implementations where wearable audio device 100 is ear-mountable, an ear coupling 112 (e.g., an ear tip or ear cushion) attached to the casing 104 surrounds an opening to the cavity 106. A passage 114 is formed through the ear coupling 112 and communicates with the opening to the cavity 106. In various implementations, one or more external microphones, e.g., first external microphone 116, second external microphone 118, and third external microphone 120 are disposed on the casing in a manner that permits acoustic coupling to the environment external to the casing 102. The first external microphone 116 may also be referred to as the "first communications microphone" or "COM1 mic" for short. The second external microphone 118 may also be referred to as the "second communications microphone" or "COM2 mic" for short. And the third external microphone 120 may also be referred to as the "feedforward microphone," or the "FF Mic" or "Concha mic" for short.

Audio output by the transducer 108 and speech captured by the external microphones 116, 118 within each earpiece is controlled by an audio processing system 122. Audio processing system 122 may be integrated into one or both earpieces 102 or be implemented by an external system. In the case where audio processing system 122 is implemented by an external system, each earpiece 102 may be coupled to the audio processing system 122 either in a wired or wireless configuration. In various implementations, audio processing system 122 may include hardware, firmware and/or software to provide various features to support operations of the wearable audio device 100, including, e.g., providing a power source, amplification, input/output, network interfacing, user control functions, active noise reduction (ANR), signal processing, data storage, data processing, voice detection, etc.

The wearable audio device 100 is configured to provide two-way communications in which the user's voice or speech is captured and then outputted to an external node via the audio processing system 122. In that regard, the external microphones 116, 118 (alone or in combination with external microphone 120) may be used for capturing the user's voice and the audio processing system 122 may be used to process those microphone signals to provide a voice signal to the far end (aka a "voice output signal") of a two-way communication (phone call).

For that purpose, the audio processing system 122 may include a left earpiece processing system 124 for processing signals from the microphones 110A, 116A, 118A, 120A of the left earpiece 102A, and a right earpiece processing system 126 for processing signals from the microphones 110B, 116B, 118B, 12B of the right earpiece 102B. The audio processing system 122 may also include a combined earpiece processing system 128 for processing signals from the left and right earpiece processing systems 124, 126. For example, the wearable audio device 100 may be configured such that microphone input from only one of the earpieces 102A, 102B (a primary earpiece) is used for providing the voice output signal (e.g., item 302, FIG. 3), and, as discussed below, the audio processing system 122 may be used to dynamically select which earpiece 102A, 102B will be used to provide the far end voice signal based on the signals received from the left and right earpiece processing systems 124, 126.

The left earpiece processing system 124 may be executed by a first processor in the left earpiece 102A and the right earpiece processing system 126 may be executed by a second processor in the right earpiece 102B. The combined earpiece processing system 128 may be executed by one of the first or second processors, or by a third processor that may reside in the left earpiece 102A, in the right earpiece 102B, or an external system (such as a mobile device coupled to one or both of the earpieces 102A, 102B).

In implementations that include ANR for enhancing audio signals, the inner microphone 110 may serve as a feedback microphone and the external microphone 120 (alone or in combination with microphones 116 and 118) may serve as a feedforward microphone. In such implementations, each earphone 102 may utilize an ANR circuit that is in communication with the inner and external microphones 110 and 120. The ANR circuit receives an internal signal generated by the inner microphone 110 and an external signal generated by the external microphone 120 (alone or in combination with microphones 116 and 118) and performs an ANR process for the corresponding earpiece 102. The process includes providing a signal to an electroacoustic transducer (e.g., speaker) 108 disposed in the cavity 106 to generate an anti-noise acoustic signal that reduces or substantially prevents sound from one or more acoustic noise sources that are external to the earphone 102 from being heard by the user. External microphone 120 may be arranged to face toward a user's concha when the device is worn, e.g., such that the microphone 27 is shielded from wind. Such configurations are disclosed in U.S. patent application Ser. No. 17/362,625 filed on Dec. 27, 2022, entitled "ACTIVE NOISE REDUCTION EARBUD," now U.S. Pat. No. 11,540,043, the complete disclosure of which is incorporated herein by reference.

Figure 2:
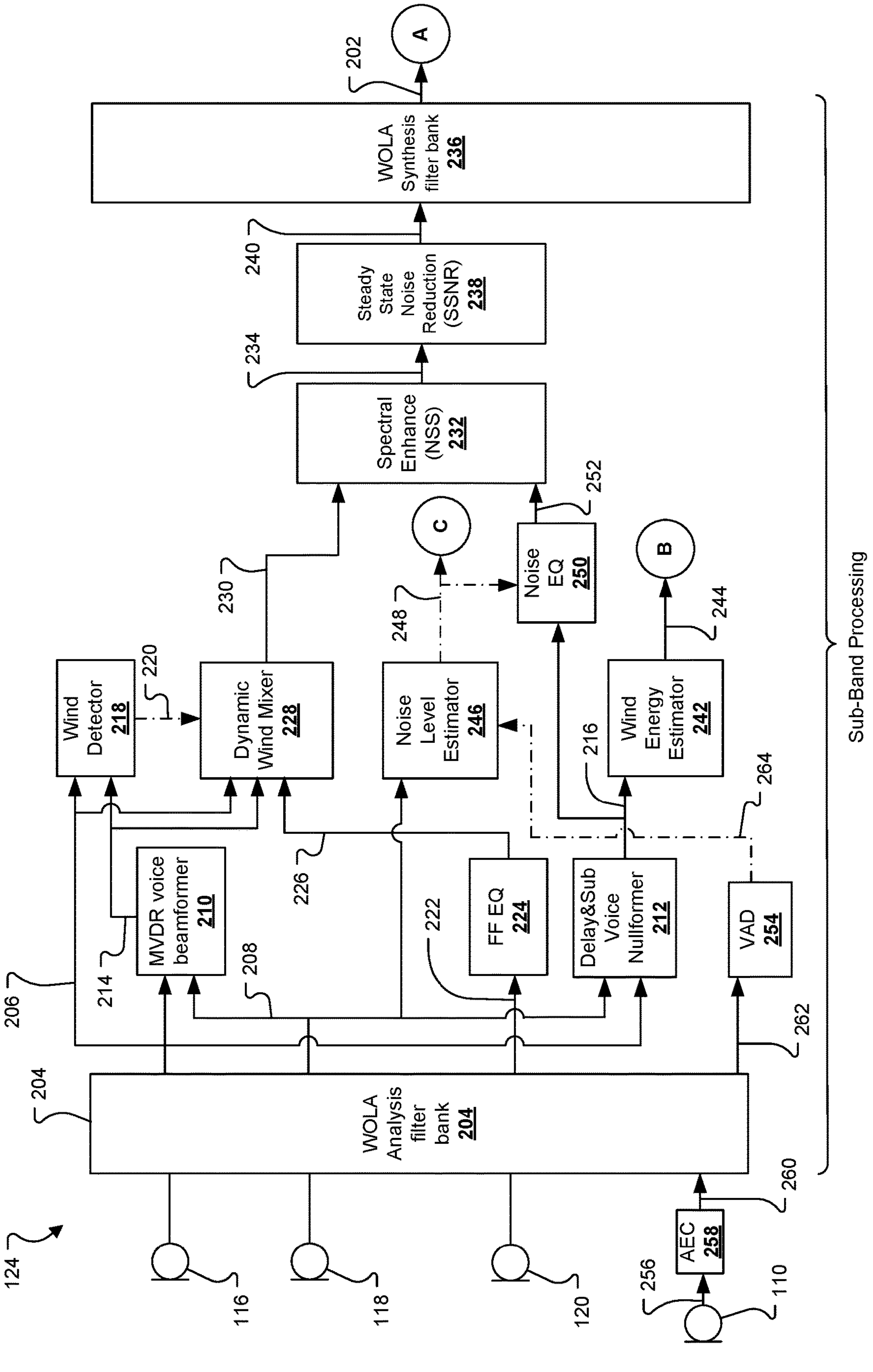
FIG. 2 is a block diagram of an audio processing system according to various implementations.

FIG. 2 depicts an illustrative embodiment of an exemplary earpiece processing system 124 (e.g., left earpiece processing system 124 or right earpiece processing system 126) that receives speech and other inputs from a set of microphones 110, 116, 118, 120 on earpiece 102, processes the inputs, and outputs an enhanced speech signal 202 for transmission or further processing. The processing illustrated in FIG. 2 is performed contemporaneously by each of the two earpieces 102A and 102B. In this embodiment, earpiece 102 is configured to capture a respective microphone signal from each of the external microphones 116, 118, and 120 and at least one internal microphone signal, in this example from an internal feedback (FB) microphone 110.

System 124 generally includes: a domain converter 204 that converts microphone signals from the time domain to the frequency domain. The domain converter 204 also separates spectral components of each microphone signal into multiple sub-bands. For example, the domain converter 204 may process the microphone signals to provide frequencies limited to a particular range, and within that range may provide multiple sub-bands that in combination encompass the full range. In one particular example, the sub-band filter may provide sixty-four sub-bands covering 125 Hz each across a frequency range of 0 to 8,000 Hz. The domain converter 204 may for example be configured to convert the time domain signal into sub-bands using a weighted overlap add (WOLA) analysis.

Each of the subsequent components in region labeled "sub-band processing" of the example system 124 illustrated in FIG. 2 may logically represent multiple such components to process the multiple sub-bands.

The domain converter 204 provides the frequency domain signals, 206 and 208, from the first external microphone 116 and the second external microphone 118, respectively, to each of two beamformers 210, 212. The beamformers 210, 212 apply array processing techniques, such as phased array, delay-and-subtract techniques, and may utilize minimum variance distortionless response (MVDR) and linear constraint minimum variance (LCMV) techniques, to adapt a responsiveness of the set of microphones 116, 118 to enhance or reject acoustic signals from various directions. Beamforming enhances acoustic signals from a particular direction, or range of directions, while null steering reduces or rejects acoustic signals from a particular direction or range of directions.

The first beamformer 210 is a beam former that works to maximize acoustic response of the set of microphones 116, 118 in the direction of the user's mouth (e.g., directed to the front of and slightly below an earpiece), and provides a first beamformed signal 214. Because of the beamforming performed by the first beamformer 210, the first beamformed signal 214 includes a higher signal energy due to the user's voice than any of the individual microphone signals.

The second beamformer 212 steers a null toward the user's mouth and provides a second beamformed signal 216. The second beamformed signal 216 includes minimal, if any, signal energy due to the user's voice because of the null directed at the user's mouth. Accordingly, the second beamformed signal 216 is composed substantially of components due to background noise and acoustic sources not due to the user's voice, i.e., the second beamformed signal 216 is a signal correlated to the acoustic environment without the user's voice.

In certain examples, the first beamformer 210 is a super-directive near-field beamformer that enhances acoustic response in the direction of the user's mouth, and the second beamformer 212 is a delay-and-subtract algorithm that steers a null, i.e., reduces acoustic response, in the direction of the user's mouth.

The first beamformed signal 214 and the frequency domain first external microphone signal 206 (aka "frequency domain COM1 mic signal") are provided to a wind detector 218, which analyzes those signals to identify whether wind is present. The wind detector 218 calculates an energy difference between the first beamformed signal 214 and the frequency domain COM1 mic signal. In that regard, the wind detector 218 may calculate the energy in each of the first beamformed signal 214 and the frequency domain COM1 mic signal 206 on a sub-band basis and then sum the calculated sub-band energies to determine a total wind energy for each of those signals before determining the difference between those two totals. In some cases, the wind detector 218 may only calculate the energy within a certain frequency band (e.g., 125 Hz to 2 kHz).

If the energy difference between the first beamformed signal 214 and the frequency domain COM1 mic signal 206 exceeds a threshold, then the wind detector 218 identifies that wind is detected. The wind detector 218 produces a wind flag signal 220 based on this analysis. The wind flag signal 220 may be a binary signal (0 or 1) indicating either a wind or a no wind condition.

A frequency domain signal 222 from the third external microphone 120 (aka "feedforward microphone" or "FF mic" or "Concha mic") is equalized via an equalization (EQ) filter 224 to produce an equalized FF mic signal 226, which is provided to a dynamic wind mixer 228 along with the frequency domain COM1 mic signal 206, the first beamformed signal 214, and the wind flag signal 220. The EQ filter 224 equalizes the FF mic signal 222 to have the same voice spectra as COM1 mic signal 206 or the first beamformed signal 214 before providing the equalized signal 226 to the dynamic wind mixer 228. The COM1 mic signal 206 and the first beamformed signal 214 are assumed to have the same voice spectra by design.

The dynamic wind mixer 228 produces a wind mixer output signal 230 that is based on the wind condition, as indicated by the wind flag signal 220. When the wind flag signal 220 indicates that wind is detected, the dynamic wind mixer 228 switches to a dynamic mixing of the frequency domain COM1 mic signal 206 and the FF mic signal 222. Mixing coefficients for the COM1 206 and FF mic signals 226 are determined based on an estimated wind energy ratio between those two signals. In that regard, the wind mixer 228 may calculate the energy in each of the frequency domain COM1 mic signal 206 and the equalized FF mic signal 226 on a sub-band basis and then sum the calculated sub-band energies to determine a total energy for each of those signals before determining the ratio between those two totals. In some cases, the wind mixer 228 may only calculate the energy within a certain frequency band (e.g., 125 Hz to 2 kHz).

In some implementations, the mixing of the COM1 mic and equalized FF mic signals only happened below a certain frequency (e.g., 2 KHz), and above that the dynamic wind mixer 228 crosses over to the first beamformed signal 214. Thus, depending on the wind condition, the wind mixer output signal 230 corresponds to either the first beamformed signal 214 or a mixed signal that includes a mix of the COM1 mic and equalized FF mic signals 206, 226 at lower frequencies (e.g., below 2 KHz) and which crosses over to the first beamformed signal 214 at higher frequencies (e.g., 2 kHz and above).

The wind mixer output signal 230 is provided to a spectral enhancer 232 (aka "noise spectral subtractor" or "NSS") along with the second beamformed signal (or an equalized version of it, as discussed below). The spectral enhancer 232 uses the wind mixer output signal 230 as a voice estimate and the second beamformed signal as a noise estimate and enhances the short-time spectral amplitude (STSA) of the user's voice/speech, thereby reducing noise in a spectrally enhanced output signal 234. Examples of spectral enhancement that may be implemented in the spectral enhancer 232 include spectral subtraction techniques, minimum mean square error techniques, and Wiener filter techniques. The spectral enhancement via the spectral enhancer 232 improves the voice-to-noise ratio of the output signal 234. Spectral enhancement may further improve system performance when there are more noise sources or changing noise characteristics. The spectral enhancer 232 may operate on the two estimate signals, using their spectral content to further enhance the user's voice component of the output signal 234.

The output of the spectral enhancer 232 (i.e., the spectrally enhanced output signal 234) is passed through an inverse domain converter 236 that generates a time domain output signal. As mentioned above, the inverse domain converter 236 may be configured to perform the opposite function of the domain converter 204. That is, the inverse domain converter acts to re-combine all the sub-bands into a single output signal (the enhanced speech signal 202) using WOLA synthesis. In some cases, the spectrally enhanced output signal may first be provided to a steady state noise reducer (SSNR) 238, which can help to remove certain ambient noise (such as HVAC noise), and noise in front of the user, and can clean up high frequency noise residue from the spectral enhancement (spectral subtraction). And the output of the SSNR 238 (the "noise reduced output 238") can then be provided to the inverse domain converter 236 to generate the output signal 202. Additional details of the SSNR 238 are described below with reference to FIG. 5.

Figure 3:
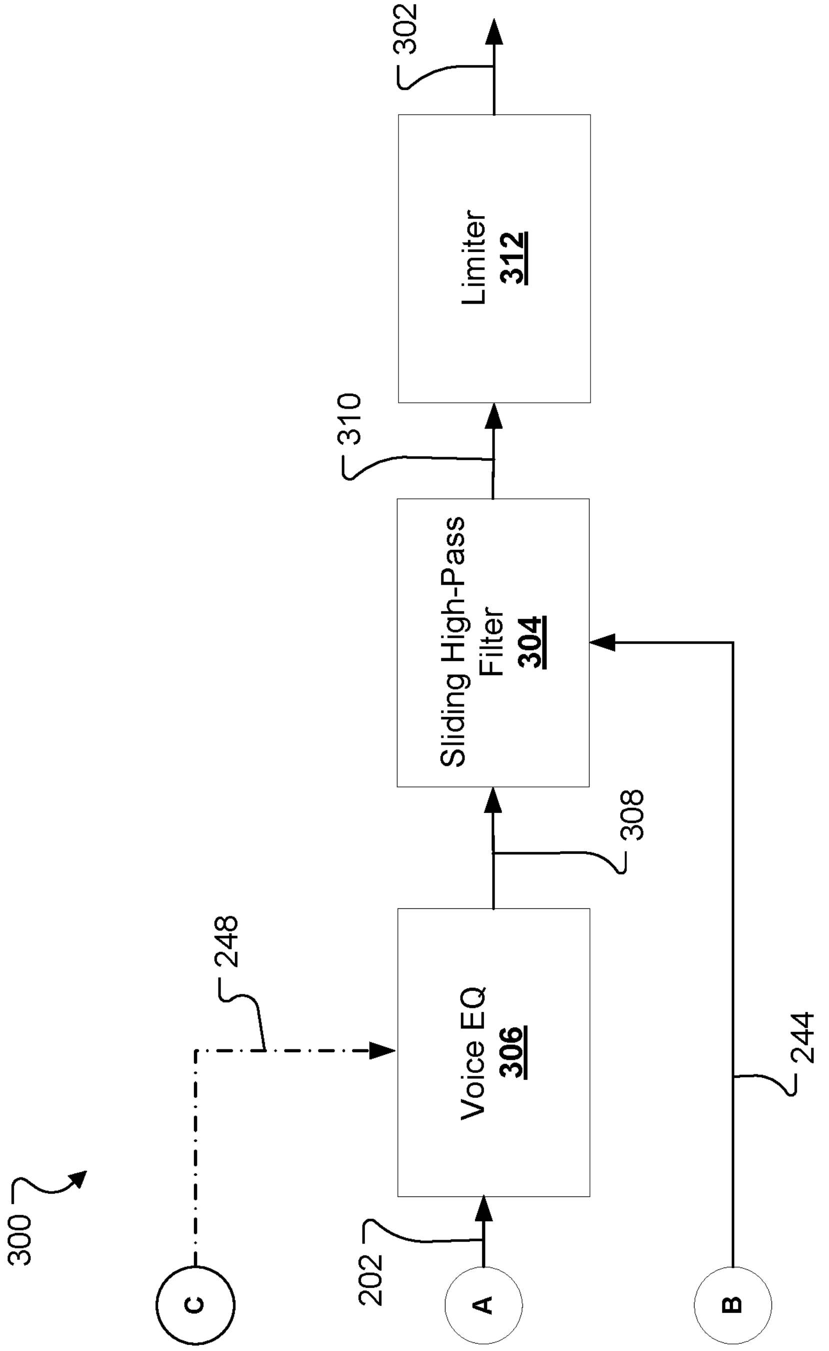
FIG. 3 is a block diagram of output stage processing that may be used in conjunction with the audio processing system of FIG. 2.

In some implementations, the output signal 202 may be provided as the voice output signal that is sent to the far end. In other implementations, additional output stage (time domain) processing 300, FIG. 3, may be performed on the output of the inverse domain converter 236 to generate the voice output signal 302. With reference to FIG. 3, additional output stage processing features may include, among other things, a sliding high-pass filter 304. The sliding high-pass filter 304 dynamically adjusts how much low frequency (wind noise) energy is cut from the voice output signal 302. For example, in high wind, frequencies below 1 KHz can be cut. That can reduce wind noise, but it can cause the user's voice to sound thin. When the wind is high, that may be an acceptable compromise. However, when the wind noise is lower, a filter with a lower corner frequency can be applied so that the voice output sound includes more of the low frequency energy, and, as a result, sounds more natural.

Referring to FIGS. 2 & 3, to enable the selection of an appropriate high-pass filter, the sliding high-pass filter 304 is provided with an estimate of the wind energy from a wind energy estimator 242 (FIG. 2). The wind energy estimator 242 takes a bandpass (e.g., 250 Hz-2 kHz) of the second beamformed signal 216 from the second (delay-and-subtract) beamformer 212 and calculates the energy of that as an estimate of the wind energy. The wind energy estimator 242 may calculate the energy on a sub-band basis (for frequencies within the passband) and then sum the calculated sub-band energies to determine a total energy for the band-passed version of second beamformed signal 216.

That wind energy estimate 244 is shared with the sliding high-pass filter 304, which maps the energy estimate to one of a plurality of different high-pass filters to apply in order to tradeoff between wind noise reduction and voice naturalness. When the wind energy is higher, the system chooses a high-pass filter with a higher corner frequency. When the wind energy is lower, the system chooses a high-pass filter with a lower corner frequency.

In some instances, the wearable audio device 100 may only provide a voice output signal to the far end from one of the earpieces 102A or 102B. In that regard, the wearable audio device 100 may detect and estimate wind noise on both earpieces 102A, 102*b*, e.g., using the system illustrated in FIG. 2, and pass those to a core processor running the combined earpiece processing system 128. The combined earpiece processing system 128 can determine which of the earpieces 102A, 102B has lower wind energy and can select that earpiece to provide the voice output signal 302 to the far end. In some cases, one of the earpieces (e.g., the right earpiece 102B) may be a designated as a primary earpiece by default, e.g., in the absence of wind, and the other earpiece (e.g., the left earpiece 102A) would be designated as a subordinate earpiece. The primary earpiece provides its voice output signal to the far end, and the combined earpiece processing system 128 may be configured to switch the roles of the earpieces depending on which earpiece has the lower wind energy—the expectation being that the earpiece with the lower wind energy will provide a clearer voice output signal.

Figure 4:
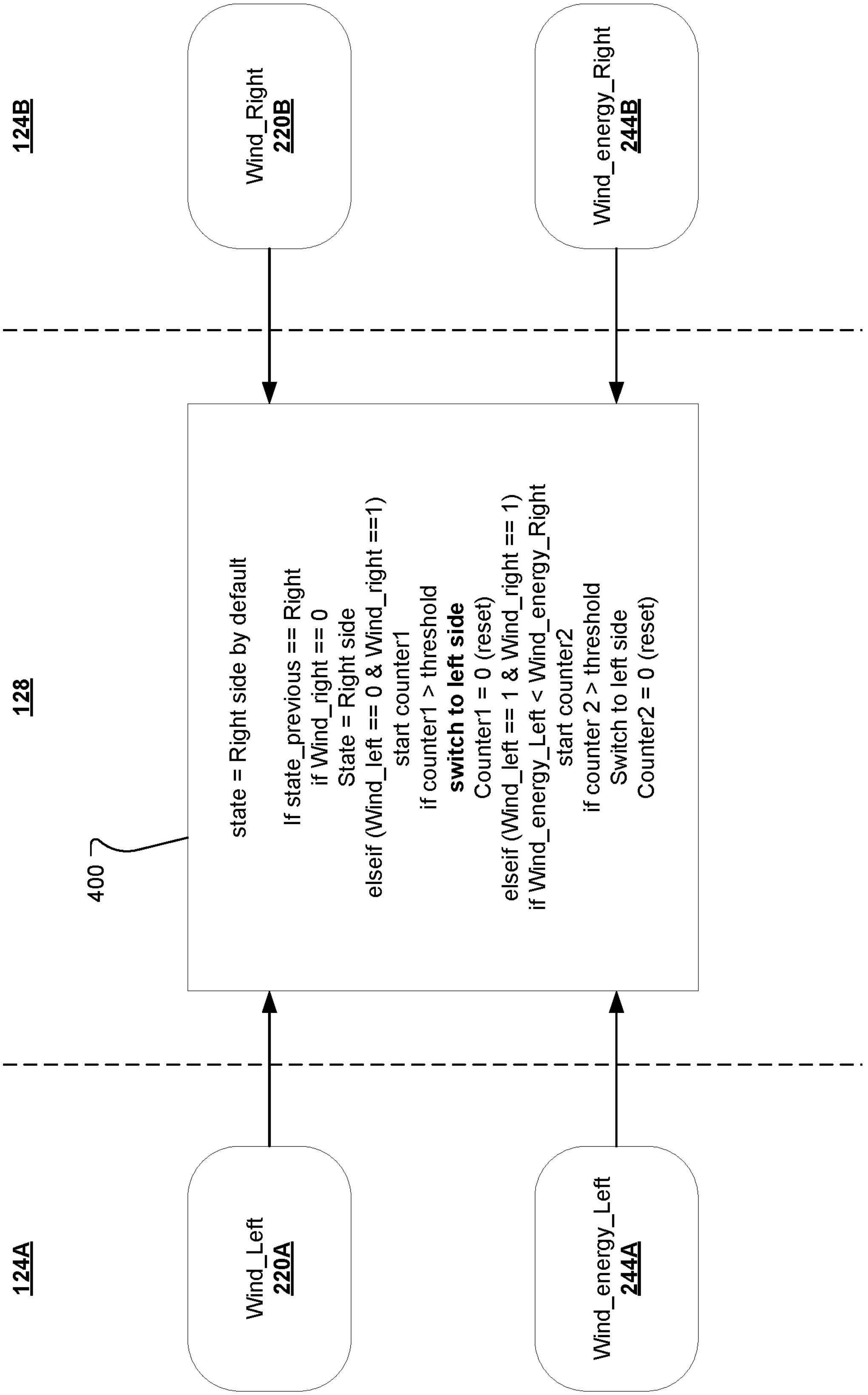
FIG. 4 is a block diagram depicting wind-based role switching logic that may be used in conjunction with the wearable audio device of FIG. 1.

FIG. 4 illustrates a block diagram for this wind-based role switch functionality. Earpiece switching logic 400 of the combined earpiece processing system 128 receives the wind flag signal 220 from the wind detector 218 (FIG. 2) and the wind energy estimate signal 244 from the wind energy estimator 242 (FIG. 2) for both the left and the right earpieces. By default, the right earpiece 102B may be designated as the primary earpiece to provide its voice output signal to the far end (state=Right side by default). The combined earpiece processing system 128 checks to determine if the previous state had the Right side set to be the primary earpiece (state_previous==Right). If so, and if the wind flag signal from the right earpiece indicates that there is no wind (Wind_right=0), then the state is set to the right earpiece (state=Right). Otherwise, if the wind flag signal from the right earpiece indicates a wind condition (Wind_right==1) and the wind flag signal from the left earpiece indicates there is no wind condition (Wind_left==0), then a counter is started, and, if those conditions persist for a predetermined amount of time (counter1>threshold), then the roles of the earpieces are switched and the left earpiece 102A is set as the primary earpiece to provide its voice output signal to the far end.

Otherwise, if the wind flag signals from the left and right earpieces both indicate a wind condition (Wind_right==1 & Wind_right==1), then the combined earpiece processing system 128 looks to the wind energy estimate signals from the left and right earpieces. And, if the estimated wind energy on the left earpiece 102A is less than the estimated wind energy on the right earpiece 102B, then that will then trigger a role switch causing the left earpiece 102A to be set as the primary earpiece.

Referring again to FIG. 2, in some implementations, the earpiece processing system 124 may be used to estimate the ambient noise level and to use that estimate to select one of plurality of different equalization filters to add to the spectral enhancer 232. The objective here is when the user is in a quiet environment, the noise spectral subtraction can be relaxed to gain more speech bandwidth. This has the effect of reducing speech artefacts when the user has an abnormal fitting or is near a hard surface such as a wall. When the user is in a noisy environment, the system gets more aggressive on noise reduction.

In that regard, the earpiece processing system 124 may include a noise level estimator 246. As shown in FIG. 2, the noise level estimator 246 may receive the frequency domain COM2 mic signal 208 to estimate the ambient noise level by calculating the energy in that signal. In that regard, the noise level estimator 246 may calculate the energy in the frequency domain COM2 mic signal 208 on a sub-band basis and then sum the calculated sub-band energies to determine the total energy in that signal. In some cases, the noise level estimator 246 may only calculate the energy within a certain frequency band (e.g., 375 Hz to 11025 Hz).

The calculated ambient noise level is compared to a threshold. When the ambient noise level estimate exceeds the threshold, the noise level estimator 246 determines that the user is in a noisy environment, and when the ambient noise level estimate is below the threshold, the noise level estimator 246 determines that the user is in a quiet environment. When the user is in a noisy environment, the system gets more aggressive on noise reduction.

The noise level estimator 246 provides a noise flag signal to a noise equalizer (EQ) 250. The noise flag signal 248 may be a binary signal (0 or 1) indicating either a quiet (0) or a noisy (1) condition. The noise EQ 250 also receives the wind flag signal 220 from the wind detector 218. Depending on whether the user is in a quiet, noisy, or windy condition, the noise EQ 250 smoothly transitions between different equalization filters to favor different noise characteristics such that improved noise reduction performance and voice spectrum may be achieved in each scenario. In some implementations, if the wind flag signal 220 indicates a windy condition (that the user is in a windy environment), then the noise EQ 250 will select the equalization filter designed for improved performance in windy conditions. In such implementations, if the wind flag signal 220 instead indicates a no wind condition (the user is not in windy environment), then the noise EQ 250 will look to the noise flag signal 248, and will apply either an equalization filter designed for improved performance in noisy conditions or an equalization filter designed for improved performance in quiet conditions depending on whether the noise flag signal 248 indicates a noisy condition or a quiet condition.

The noise EQ 250 applies the selected one of the EQ filters to the second beamformed signal 216 and provides the equalized beamformed signal 252 to the spectral enhancer 232 for processing. The equalized beamformed signal 252 is effectively a noise reference signal for the spectral enhancer 232.

For noise, the noise spectra is kept in the low frequencies to help ensure that the spectral enhancer 232 attenuates low frequency noise but maintains the high frequencies for higher voice bandwidth. For a quiet condition, a much attenuated equalization filter (relative to the noise filter) may be used since there is not much noise to reduce. For wind conditions, the wind EQ filter is selected such that the spectral enhancer 232 attenuates high frequency noise but relaxes on low frequencies.

In order to have a consistent and smooth noise estimate, a voice activity detector (VAD) 254 may be used to freeze the ambient noise level estimate when the user is talking.

In some cases, the VAD 254 may use a signal 256 from the inner (feedback) microphone 110 to detect voice activity. In some implementations, the inner microphone signal 110 may be filtered, e.g., via an acoustic echo canceller (AEC) 258, to provide a clean feedback (FB) microphone signal 260 to the domain converter 204, and the frequency domain clean FB microphone signal 262 (from the domain converter 204) may be input to the VAD 254. The VAD 254, in turn, provides a VAD flag signal 264 to the noise level estimator 246. The VAD flag signal 264 may be a binary signal (0 or 1) indicating either a voice (user is speaking) or a no voice (user is not speaking) condition. When the VAD flag signal 264 indicates that the user is speaking, the noise level estimator 246 will freeze the ambient noise level estimate until that condition abates.

Figure 5:
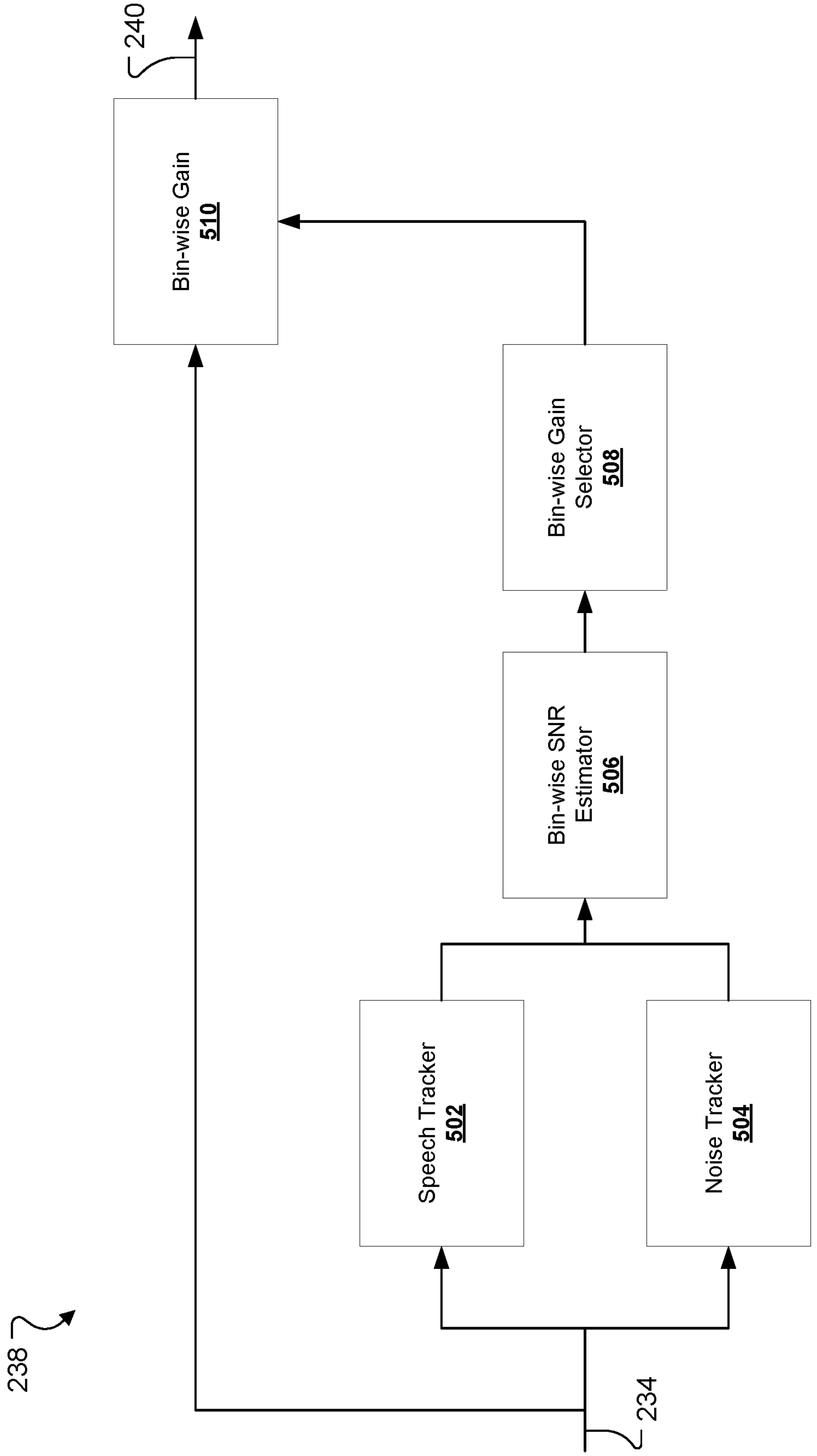
FIG. 5 is a block diagram depicting an example steady state noise reducer from the audio processing system of FIG. 2.

As mentioned above, some implementations may include a steady state noise reducer (SSNR) 238 that receives the spectrally enhanced output signal 234 from the spectral enhancer 232 and provides further noise reduction before providing the noise reduced output signal 240 (a noise reduced version of the enhanced output signal 234) to the inverse domain converter 236. The SSNR 238 removes certain noises such as HVAC noise, noise in front of the user (e.g., from a computer fan), and cleans up high frequency noise residue from the spectral enhancer 232. With reference to FIG. 5, each subband of the spectrally enhanced output signal 234 goes through two energy trackers: a speech tracker 502 and a noise tracker 504. The speech tracker 502 has a fast attack and a slow decay, and the noise tracker 504 has a slow attack and a fast decay to estimate a bin-wise signal-to-noise ratio (SNR) via bin-wise SNR estimator 506. The SNR is then mapped to negative attenuation coefficients at each bin (via bin-wise gain selector 508) before being applied via a bin-wise gain 510 to the signal 234.

Referring again to FIG. 3, in some implementations, the additional output stage processing 300 may include a voice equalizer (EQ) 306. The voice EQ 306 receives the noise flag signal 248 from the noise level estimator 246 and applies a different equalization filter (e.g., a "quiet" EQ filter or a "noisy" EQ filter) to the output of the inverse domain converter 236 to generate the voice output signal 302. Because the system is able to detect if the user is in a quiet or noisy environment, it is able to smoothly toggle between the two voice EQ filters for improved spectral naturalness.

The equalized output signal 308 is provided to the sliding high-pass filter 304, which applies the selected high-pass filter based on the wind energy estimate 244 to provide a filtered output signal 310. In some implementations, the filtered output signal 310 may pass through a limiter 312 before it is sent to the far end.

According to various implementations, a wearable audio device provides the technical effect of enhancing voice pick-up during challenging environmental conditions, e.g., high wind or noise.

It is noted that the implementations described herein are particularly useful for two-way communications such as phone calls, especially when using ear buds. However, the benefits extend beyond phone call applications. These technologies are also applicable to aviation and military use where high nose pick up with ear buds is desired. Further potential uses include peer-to-peer applications where the voice pickup is shielded from echo issues normally present. Other use cases may involve automobile 'car wear' like applications, wake word or other human machine voice interfaces in environments where external microphones will not work reliably, self-voice recording/analysis applications that provide discreet environments without picking up external conversations, and any application in which multiple external microphones are not feasible. Further, the implementations may be useful in work from home or call center applications by avoiding picking up nearby conversations, thus providing privacy for the user.

It is understood that one or more of the functions of the described systems may be implemented as hardware and/or software, and the various components may include communications pathways that connect components by any conventional means (e.g., hard-wired and/or wireless connection). For example, one or more non-volatile devices (e.g., centralized or distributed devices such as flash memory device(s)) can store and/or execute programs, algorithms and/or parameters for one or more described devices. Additionally, the functionality described herein, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions. All or part of the functions can be implemented as, special purpose logic circuitry, e.g., an FPGA (field programmable gate array) and/or an ASIC (application-specific integrated circuit). Processors suitable for the execution of a computer program include, by way of example, both general and special purpose microprocessors, and any one or more processors of any kind of digital computer. Generally, a processor may receive instructions and data from a read-only memory or a random access memory or both. Components of a computer include a processor for executing instructions and one or more memory devices for storing instructions and data.

It is noted that while the implementations described herein utilize microphone systems to collect input signals, it is understood that any type of sensor can be utilized separately or in addition to a microphone system to collect input signals, e.g., accelerometers, thermometers, optical sensors, cameras, etc.

Additionally, actions associated with implementing all or part of the functions described herein can be performed by one or more networked computing devices. Networked computing devices can be connected over a network, e.g., one or more wired and/or wireless networks such as a local area network (LAN), wide area network (WAN), personal area network (PAN), Internet-connected devices and/or networks and/or a cloud-based computing (e.g., cloud-based servers).

In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

A number of implementations have been described. Nevertheless, it will be understood that additional modifications may be made without departing from the scope of the inventive concepts described herein, and, accordingly, other implementations are within the scope of the following claims.

What is claimed is:

1. A wearable two-way communication audio device, comprising:

a first microphone that provides a first microphone signal;

a second microphone that provides a second microphone signal;

a third microphone that provides a third microphone signal;

one or more processors configured to:

process the first microphone signal and the second microphone signal to form a first beamformed signal;

compare energy in the first beamformed signal to energy in the first microphone signal;

if energy in the first beamformed signal exceeds energy in the first microphone signal, then mix the first microphone signal and the third microphone signal to provide a mixed signal; and generate a voice output signal for transmission to a far end recipient using the mixed signal.

2. The wearable two-way communication audio device of claim 1, wherein mixing the first microphone signal and the third microphone signal comprises:

calculating an energy ratio between the first microphone signal and the third microphone signal, and selecting mixing coefficients for the first microphone signal and the third microphone signal based on the calculated energy ratio.

3. The wearable two-way communication audio device of claim 1, wherein generating the voice output signal using the mixed signal comprises:

using the mixed signal to generate a first signal component in a first frequency range for the voice output signal and using the beamformed signal to generate second signal component in a second frequency range for the voice output signal; and combining the first signal component and the second signal component to provide the voice output signal.

4. The wearable two-way communication audio device of claim 1, wherein the one or more processors are configured to mix the first microphone signal and the third microphone signal to provide the mixed signal only if the energy in the first beamformed signal exceeds energy in the first microphone signal by a predetermined threshold.

5. The wearable two-way communication audio device of claim 4, wherein the one or more processors are configured such that, if the energy in the first beamformed signal does not exceed the energy in the first microphone signal by the pre-determined threshold, then the first beamformed signal is used to generate the voice output signal.

6. The wearable two-way communication audio device of claim 5, wherein the one or more processors are configured such that, if the energy in the first beamformed signal does not exceed the energy in the first microphone signal by the pre-determined threshold, then the first microphone signal and the third microphone signal are not mixed.

7. The wearable two-way communication audio device of claim 1, wherein the one or more processors are configured such that, if the energy in the beamformed signal does not exceed the energy in the first microphone signal, then the first beamformed signal is used to generate the voice output signal and the mixed signal is not used to generate the voice output signal.

8. The wearable two-way communication audio device of claim 1, wherein the one or more processors are configured such that, if the energy in the first beamformed signal exceeds the energy in the first microphone signal, then the first microphone signal and the third microphone signal are mixed to provide the mixed signal, and the voice output signal is generated using a combination of the mixed signal and the first beamformed signal.

9. The wearable two-way communication audio device of claim 1, wherein the one or more processors are configured such that the first beamformed signal is used to provide a first signal component comprising frequency content above a predetermined frequency, and the mixed signal is used to provide a second signal component comprising frequency content below the predetermined frequency; and the first signal component and the second signal component are combined to provide the voice output signal.

* * * * *